United States Patent [19]
Thomson

[11] Patent Number: 5,574,848
[45] Date of Patent: Nov. 12, 1996

[54] CAN INTERFACE SELECTING ONE OF TWO DISTINCT FAULT RECOVERY METHOD AFTER COUNTING A PREDETERMINED NUMBER OF RECESSIVE BITS OR GOOD CAN FRAMES

[75] Inventor: Thomas W. Thomson, Santa Cruz, Calif.

[73] Assignee: National Semiconductor Corporation, Santa Clara, Calif.

[21] Appl. No.: 111,383

[22] Filed: Aug. 24, 1993

[51] Int. Cl.$^6$ ................................................. G06F 13/00
[52] U.S. Cl. ...................... 395/181; 395/200.01; 371/5.1
[58] Field of Search ...................... 395/200, 275, 395/500; 371/11.2, 29.1

[56] References Cited

U.S. PATENT DOCUMENTS

| | | | |
|---|---|---|---|
| 5,111,460 | 5/1992 | Botzenhardt et al. | 371/29.1 |
| 5,357,518 | 10/1994 | Peter | 371/11.2 |

FOREIGN PATENT DOCUMENTS

| | | |
|---|---|---|
| A 0 290 129 | 11/1988 | European Pat. Off. . |
| A 89 09976 | 10/1989 | WIPO . |

OTHER PUBLICATIONS

A. Raab, "Can–Controller Area Network." *Elector Electronics*, vol. 18, No. 203 (Sep. 1992), Canterbury GB, pp. 56–59.
Motorola Ltd., Motorola Product Specification Booklet, "MC68HC05X4, MC68HC705X4: High–density Complementary Metal Oxide Semiconductor (HCMOS) Microcomputer Unit", 1992, 81 pgs.
Robert Bosch GmbH, "CAN Specification, Version 2.0", Sep. 1991, pp. Part B–33 through Part B–68.
Philips Semiconductors, "Preliminary Product Specification, Version 2.0", Jun. 1992, pp. 1 through 58.

*Primary Examiner*—Thomas C. Lee
*Assistant Examiner*—Duo Chen
*Attorney, Agent, or Firm*—Skjerven, Morrill, MacPherson, Franklin & Friel

[57] ABSTRACT

A CAN node with a CAN protocol controller device reconnects to a CAN bus from the node's busoff state only after the node has successfully decoded a plurality of good messages from other devices on the CAN bus. Reception of a plurality of good messages advantageously provides a CAN protocol controller device which exits its busoff state with a high degree of confidence that the fault that caused the node to enter the busoff state has been cleared.

5 Claims, 16 Drawing Sheets

IDE = Identifier Extension Bit
The IDE bit in the standard format is transmitted "dominant", whereas in the extended format the IDE bit is recessive and the id is expanded to 29 bits.

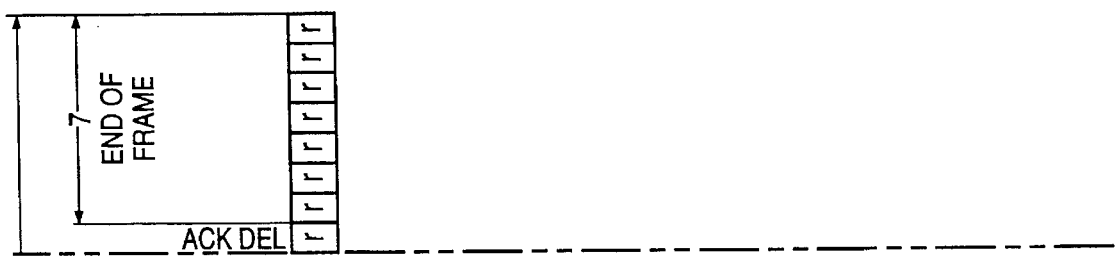

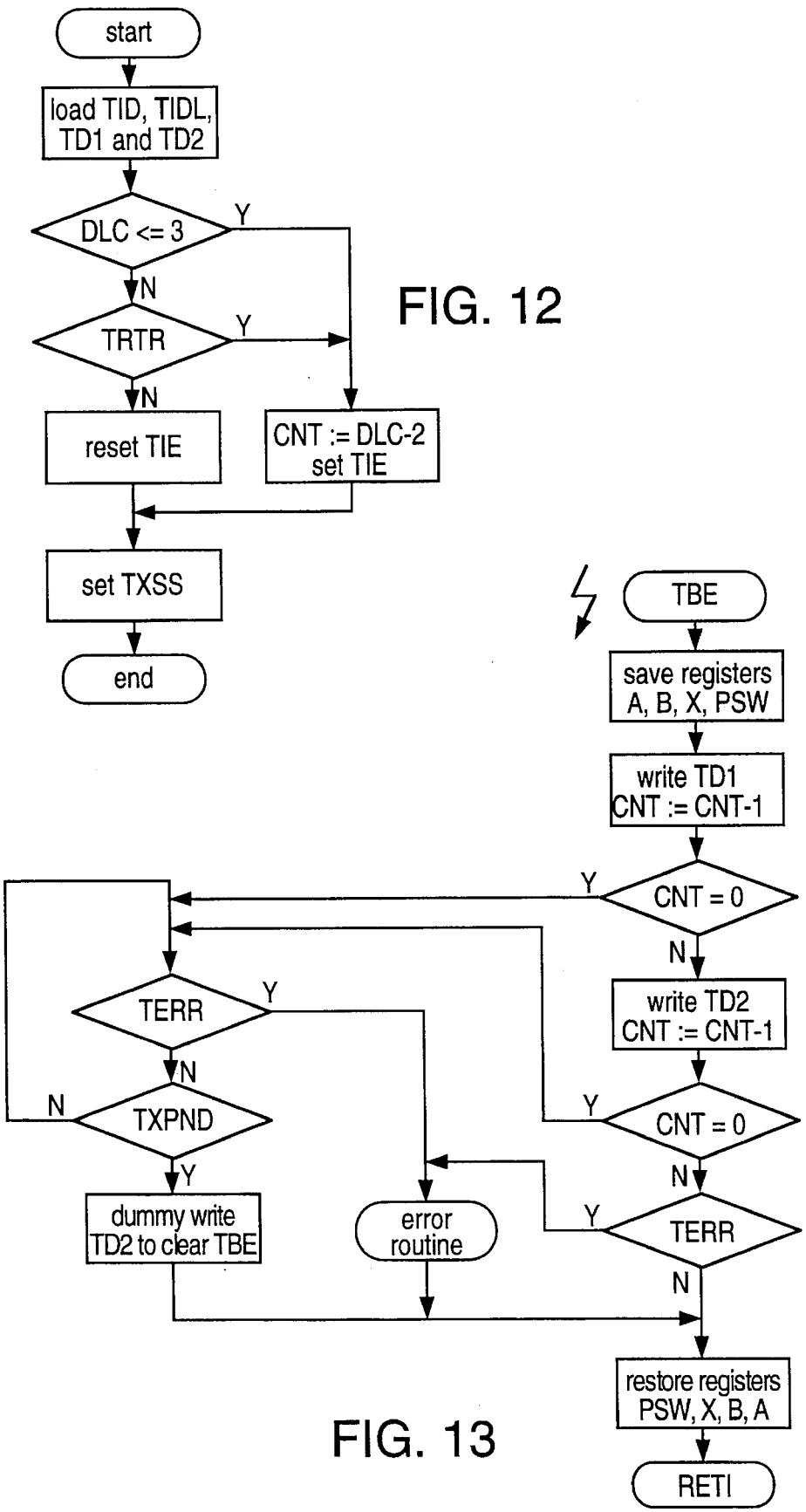

CAN INTERFACE SELECTING ONE OF TWO DISTINCT FAULT RECOVERY METHOD AFTER COUNTING A PREDETERMINED NUMBER OF RECESSIVE BITS OR GOOD CAN FRAMES

FIELD OF THE INVENTION

This invention relates to a serial interface for automotive applications. More particularly, this invention relates to a CAN interface or a VAN interface.

BACKGROUND INFORMATION

The Controller Area Network (CAN) protocol is a serial communication protocol for communicating between various electronic devices of a vehicle such as an automobile. In accordance with the CAN protocol, multiple different electronic devices of a vehicle can be coupled to a single serial bus such that messages and data may be sent from one electronic device of the vehicle to another. The CAN protocol is a message based protocol wherein CAN frames are placed on a common CAN bus. The CAN bus may be a single wire or may be a differentially driven pair of wires. Each electronic device ("node") on the common CAN bus receives each frame present on the bus and filters out those frames which are not required in performing that node's tasks. For example, if a device associated with an automobile dashboard sends onto the CAN bus a frame requesting that the automobile headlights be turned on, then the device on the CAN bus responsible for the brake lights can determine that the frame is intended for another node and therefore will not act upon the frame. The device controlling the headlights, however, receives and acts upon the frame by turning the headlights on. Identifier bits are therefore provided in CAN frames to allow messages and data to be directed to certain nodes on the CAN bus and not to other nodes on the CAN bus.

FIGS. 1A–D (Prior Art) are diagrams illustrating four different types of CAN frames. In FIGS. 1A–D, and "r" designates a bit having recessive logic level and a "d" designates a bit having a dominant logic level. If one node places a dominant bit on the bus at the same time that another node places a recessive bit on the bus, the bus will assume the logic level of the dominant bit. By monitoring the voltage level on the bus, the node attempting to transmit the recessive bit will be able to determine that the bus is not idle but rather than traffic exists on the bus.

FIG. 1A is a diagram of a CAN data frame. Data frames are used to transmit information such as data and/or messages from one node to another node over the CAN bus. The data frame of FIG. 1A includes a start of frame bit, an arbitration field, a control field, a data field, a cyclic redundancy check (CRC) field, an acknowledgement field and an end of frame field. The data field includes up to eight bytes of data. A message may, for example be encoded in the date field. FIG. 1B is a diagram of a CAN remote frame. A remote frame is used to request data from other CAN nodes. A remote frame is identical to a data frame except that the remote transmission request (RTR) bit is 'recessive' and there is no data field. FIG. 1C is a diagram of a CAN error frame. Error frames are used to communicate error conditions detected on the CAN bus to other nodes. An error frame can start anywhere in the middle of another frame. FIG. 1D is a diagram of a CAN overload frame. An overload frame is used to indicate that a receiving node is not able to process all the information sent to it over the CAN bus. An overload frame can only start at the end of another frame. Using these four types of frames, information can be passed back and forth between the various devices (nodes) coupled to a CAN bus.

FIG. 2 (Prior Art) is an illustration of a typical electronic device coupled to a CAN bus in a vehicle. The device includes a core processor 1, an associated CAN interface 2, and input/output circuitry 3. The input/output circuitry 3 couples the core processor to the vehicle. The input/output circuitry 3 may, for example, be coupled to actuators and sensors which are part of a control loop. The input/output circuitry 3 may include input/output circuitry such as drivers, amplifiers, buffers, registers, timers, A/D converters, and D/A converters disposed on a single integrated circuit chip with the processor core. The input/output circuitry may also include input/output circuitry not realized on the same integrated circuit as the processor core. The CAN interface 2 couples the core processor 1 to a CAN bus 4.

In one CAN interface of the prior art, communication transactions are handled by the CAN interface. In order to transmit a message, the core processor places the data field of a frame to be transmitted into a transmit buffer of the CAN interface 2 which is adequately long to hold the data field. The core processor 1 than sets a designated bit in the CAN interface which indicates to the CAN interface that a frame containing the information in the transmit buffer is to be transmitted. The CPU is then free to attend to other tasks which the CAN interface transmits the frame. The CAN interface determines that the bus is idle and then transmits the frame, the bits of the data field being sent from the transmit buffer in the CAN interface. Similarly, when a frame is to be received, the CAN interface receives the entire data field of the frame into a single receive buffer in the CAN interface which is adequately long to hold the received data field. Only if the frame was received error free does the CAN interface alert the core processor. If any transmission error occurs, the CAN interface handles the error in accordance with the CAN protocol without requiring any action by the core processor. The core processor is therefore able to read the complete correctly received data field from the receive buffer of the CAN interface.

Core processors having such a CAN interface have, however, been somewhat costly due to the silicon area associated with realizing the CAN interface. Because multiple devices, each having its own CAN interface, are to be coupled to the CAN bus in an automobile, the high cost of each of the CAN interfaces sums and increases the cost of the automobile.

SUMMARY

In accordance with the present invention, a CAN node with a CAN protocol controller device reconnects to a CAN bus from the node's busoff state only after the node has successfully decoded a plurality of good messages from other devices on the CAN bus. Reception of a plurality of good messages advantageously provides a CAN protocol controller device which exits its busoff state with a high degree of confidence that the fault that caused the node to enter the busoff state has been cleared.

In accordance with one embodiment of the present invention, a transmit buffer only two bytes long and a receive buffer only two bytes long are provided in a CAN interface. Software executing in a core processor operates in combination with the two-byte transmit and receive buffers to implement the equivalent of an eight byte transmit buffer and an eight byte receive buffer of a CAN interface. In the reception of an incoming frame having a data field over two bytes in length, each successive two bytes of the incoming data field is read by the core processor from the two registers of the receive buffer of the CAN interface to make room for subsequent bytes of the data field to be received by the CAN interface and to be placed into the receive buffer. Similarly, after the transmission by the CAN interface of two bytes of the outgoing data field, a subsequent pair of data field bytes is written by the core processor into the two byte transmit buffer of the CAN interfaces so that the CAN interface can transmit those next two bytes. In some embodiments, the entire data field of the frame to be transmitted is stored in eight bytes of data random access memory (RAM) of the core processor so that the data field can be subsequently transferred two bytes at a time from the data memory to the transmit buffer in the CAN interface. Similarly, an eight byte data field being received may be assembled two bytes at a time to form a single eight byte data field in eight bytes of core processor data memory.

The core processor determines when to service the two byte transmit buffer and the two byte receive buffer of the CAN interface by either polling predetermined bits in the CAN interface or by handling an interrupt generated by the CAN interface.

In accordance with some embodiments of the invention, a vehicle has a first node and a plurality of second nodes coupled to a CAN bus, the first node having receive and transmit buffers long enough to hold an eight byte data field, each second node having receive and transmit buffers which are not long enough to hold an eight byte data field. The first node and the plurality of second nodes all have core processors which execute the same instruction set. By reducing the number of bits which can be held in the transmit and receive buffers of the CAN interface, the total silicon area required to realize the CAN interface is reduced and the cost of realizing an integrated circuit having the core processor and CAN interface is reduced. Where a plurality of nodes are provided in a vehicle, and where a plurality of those nodes have a reduced CAN interface silicon area, the cost of the vehicle may be significantly reduced.

BRIEF DESCRIPTION OF THE DRAWINGS

FIGS. 1A–1D (Prior Art) are diagrams illustrating a CAN data frame, a CAN remote frame, a CAN error frame, and a CAN overload frame.

FIG. 12 is a flowchart of an example of a CAN interrupt controlled transmit routine executing in the core processor in accordance with the present invention.

FIG. 13 is a flowchart of an example of a CAN transmit interrupt routine only for frames having more than two data bytes in accordance with the present invention.

DETAILED DESCRIPTION

The following includes a detailed description of the best presently contemplated mode for carrying out the invention. The description is intended to be merely illustrative of the invention and should not be taken in a limiting sense.

Figure 3:
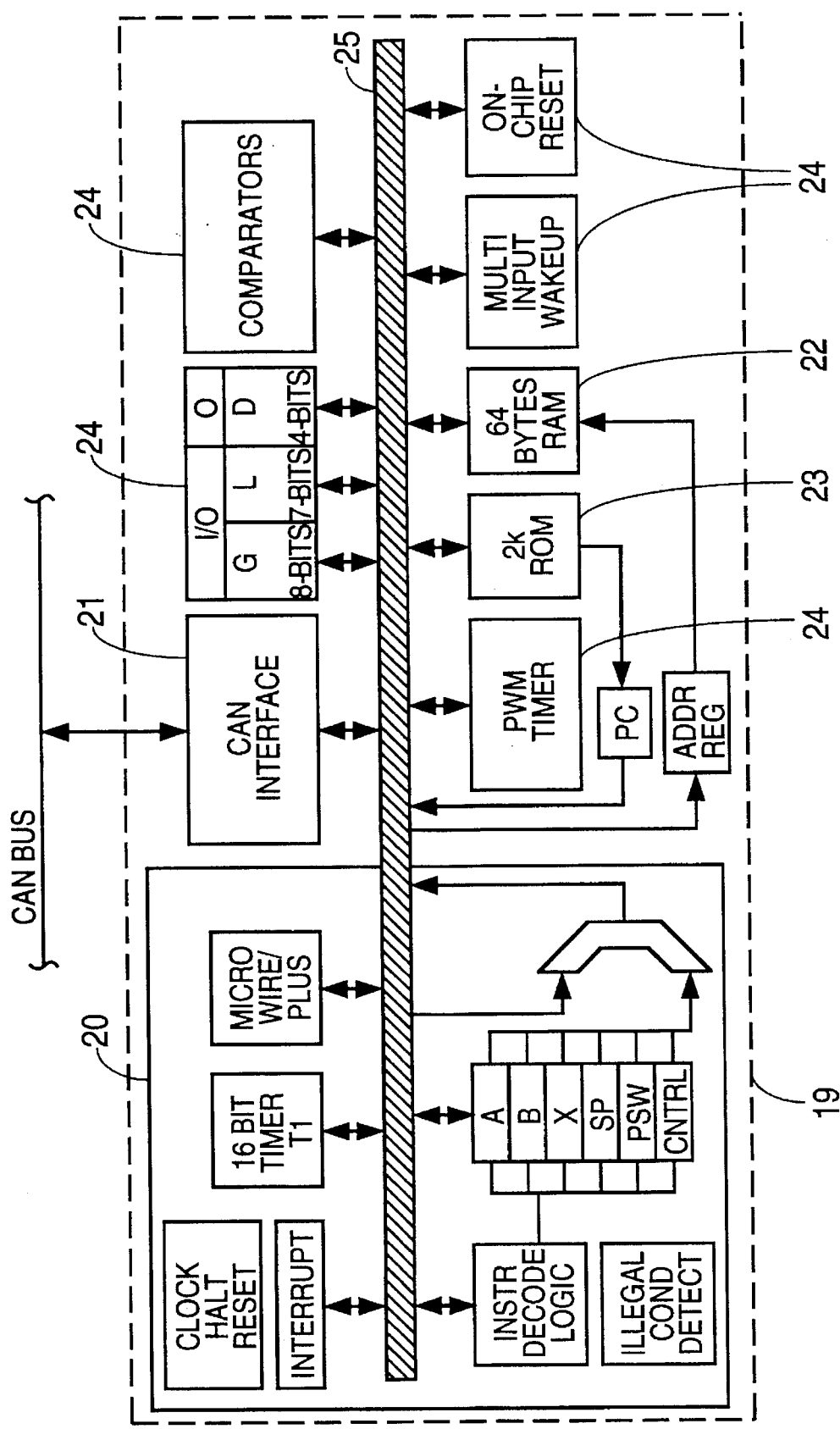
FIG. 3 is a block diagram of an integrated circuit in accordance with one embodiment of the present invention.

FIG. 3 is a block diagram of an integrated circuit 19 in accordance with one embodiment of the present invention. The integrated circuit 19 includes a core processor 20 which is coupled to a CAN interface 21, a random access memory (RAM) 22 (RAM 22 may be considered part of the core processor 20), a read only memory (ROM) 23 (ROM 23 may be considered part of the core processor 20), and input/output circuitry 24 by an internal parallel bus 25. In one embodiment, the integrated circuit is a single chip, 8-bit, fully static, CMOS microcontroller designated the COP888BC fabricated using double-metal silicon gate CMOS technology and packaged in a 28-pin dual-in-line surface mount package. Core processor 20 has a modified Harvard architecture wherein program memory in ROM 23 is separated from data memory in RAM 22. The core processor has registers including a 15-bit program counter register PC, an 8-bit accumulator A, an 8-bit RAM address pointer B which can be optionally post auto incremented or decremented, an alternate 8-bit RAM address pointer X which can also be optionally post auto incremented or decremented, an 8-bit stack pointer SP which points to the subroutine/interrupt stack in RAM and which is initialized to RAM address 02F hex on reset, an 8-bit PSW register used for communication and control, and an 8-bit control register CNTRL register. All core processor registers except A and PC are memory mapped.

Figure 4:
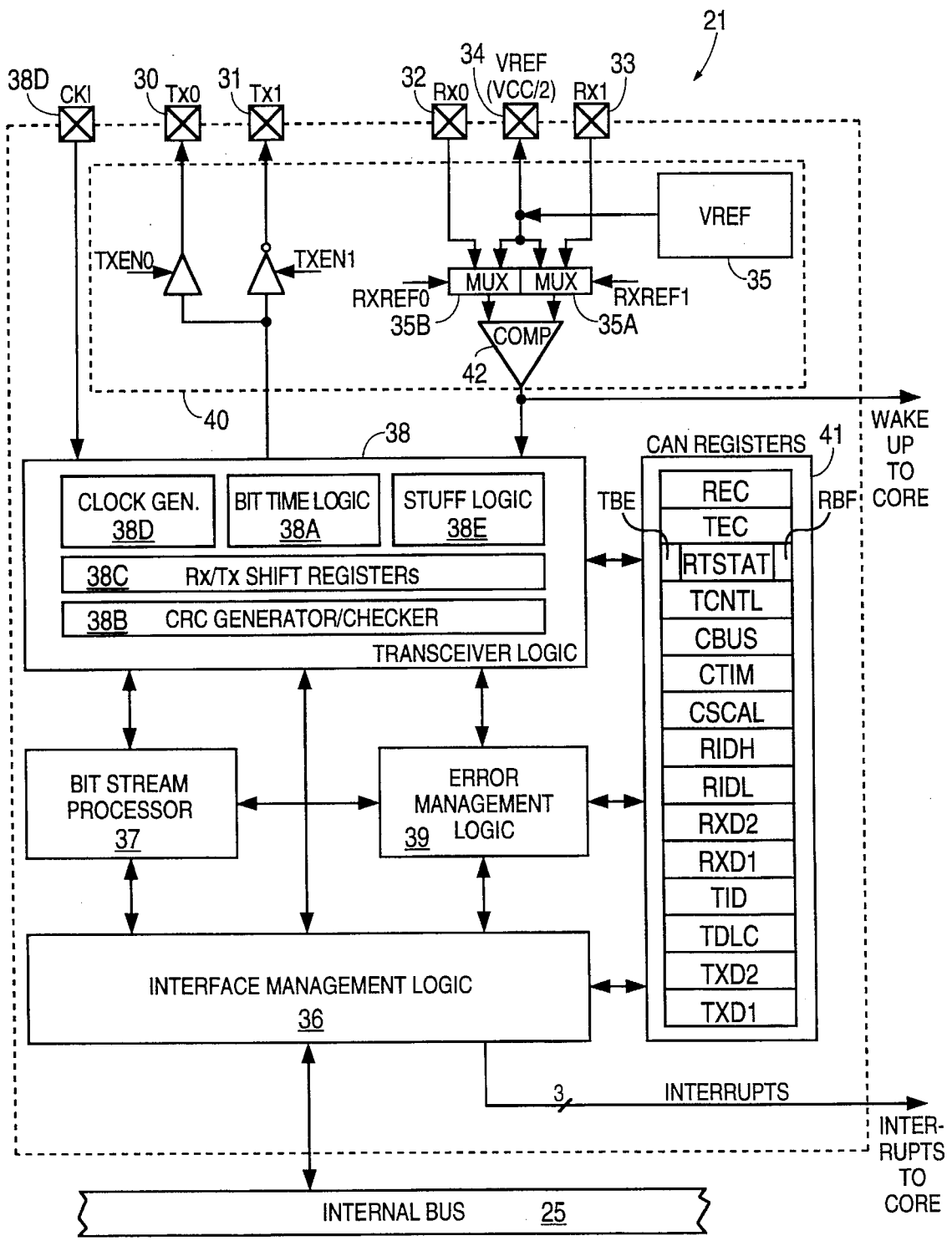
FIG. 4 is a block diagram of a CAN interface in accordance with the present invention.

FIG. 4 is a block diagram of CAN interface 21 coupled to internal bus 25. The CAN interface includes a TX0 output pin 30, a TX1 output pin 31, a RX0 input pin 32, a RX1 input pin 33, and a voltage reference output pin 34 designated VREF. The VREF pin 34 provides an access to an on-chip voltage reference 35 which supplies a reference voltage output of VCC/2. Although CAN interface 21 is compatible with CAN Specification 2.0 part B, CAN interface 21 does not have the capability of receiving and transmitting frames in the extended frame format. Extended frames on the CAN bus are, however, checked and acknowledged by the CAN interface 21 in accordance with Part B of the CAN Specification, Revision 2.0.

The transmit buffer of CAN interface 21 has only two registers TXD1 and TXD2. Each register is 8-bits in length. If, for example, more than two data field bytes are to be transmitted by the CAN interface in one frame, then software executing in the core processor writes successive bytes of the data field to the two CAN data transmit registers TXD1 and TXD2 at the appropriate time so that the entire data field is transmitted properly from the CAN interface. Software executing in the core processor may poll a dedicated transmit buffer empty (TBE) bit at address 00BC to determine when two successive data field bytes of the frame should be written to the two CAN data transmit registers TXD1 and TXD2. Alternatively, the CAN interface can be configured to generate a hardware interrupt to the core processor to indicate to the core processor that an additional byte or bytes of the data field should be written to the two CAN data transmit registers TXD1 and TXD2.

Similarly, the receive buffer of CAN interface 21 only has two registers RXD1 and RXD2. If, for example, more than two data field bytes are to be received over the CAN bus by the CAN interface, then software executing in the core processor must read the first bytes of the data field from two CAN data transmit registers RXD1 and RXD2 before the two receive registers of the CAN interface are overwritten with subsequently received data bytes of the frame. Software executing in the core processor may poll a dedicated receive buffer full (RBF) bit at address 00BC to determine when the data field bytes should be read from the two CAN data receive registers RXD1 and RXD2 before the received bytes of data are overwritten. Alternatively, the CAN interface can be configured to generate an interrupt to the core processor to indicate to the core processor when the two receive registers RXD1 and RXD2 should be read. Although all messages longer than two bytes must be processed by software, messages having data fields not longer than two bytes are automatically retransmitted when required due to bus contention in accordance with the CAN protocol.

Figure 4A:
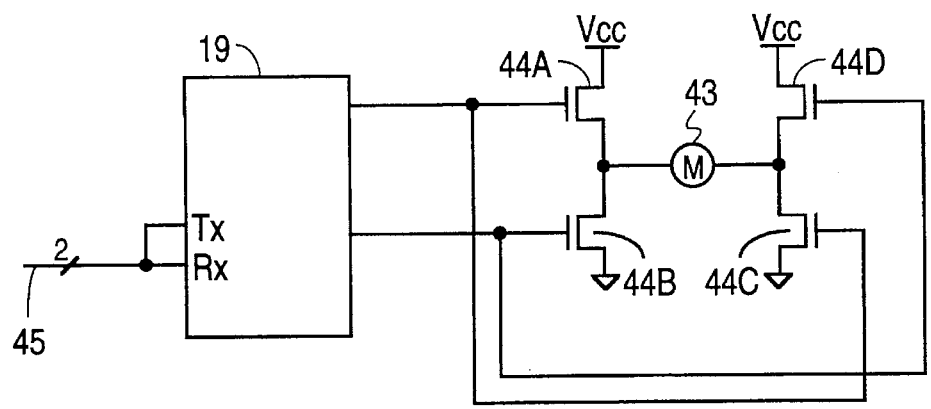
FIG. 4A is a simplified diagram illustrating an integrated circuit controlling an electric motor in accordance with one possible embodiment of the present invention.
Figure 4B:
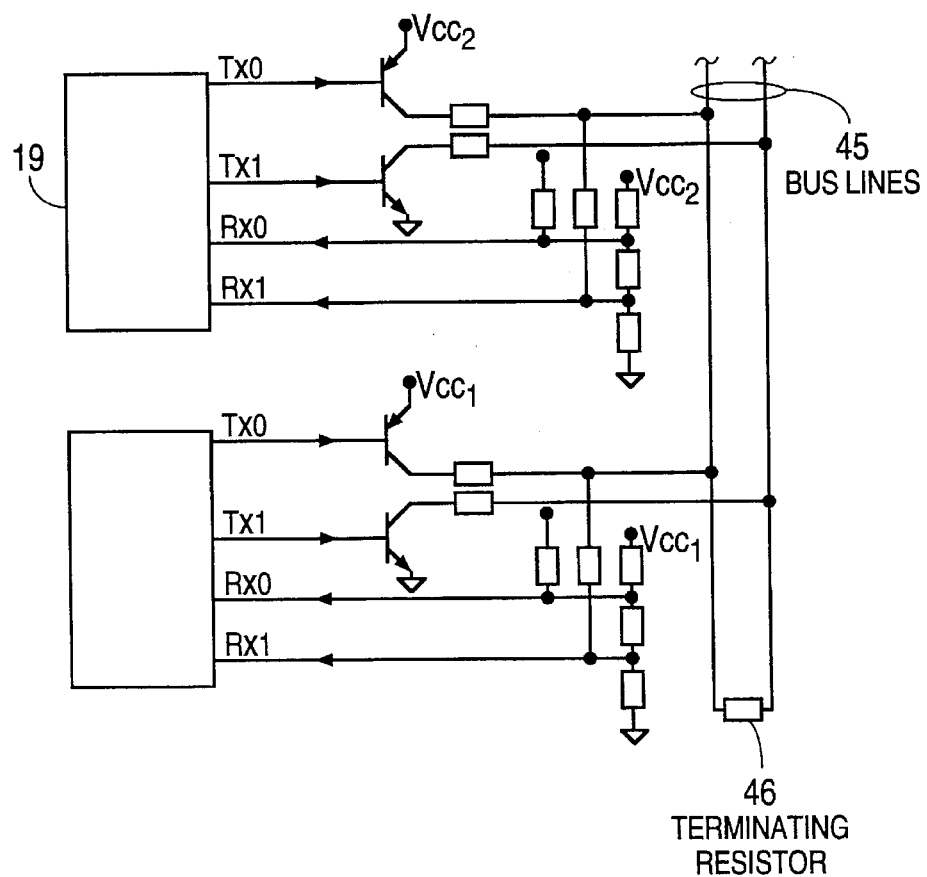
FIG. 4B is a diagram illustrating one possible coupling of an integrated circuit to a CAN bus line in accordance with one possible embodiment of the present invention.

FIG. 4A is a simplified diagram illustrating an integrated circuit 19 including a CAN interface 21 controlling a motor 43 via four MOS power transistors 44A–44D in accordance with one embodiment of the present invention. Integrated circuit 19 is coupled to two CAN bus lines 45. FIG. 4B shows additional details of one possible coupling of integrated circuit 19 to the two CAN bus lines 45 wherein a terminating resistor 46 is provided between lines 45.

The CAN interface 21 of FIG. 4 includes interface management logic 36, a bit stream processor 37, transceiver logic 38, error management logic 39, a plurality of CAN registers 41, and an output drivers/input comparators block 40. The interface management logic 36 includes a state machine which executes transmission and reception commands issued by the core processor and which controls the transfer of data bytes between RX/TX registers 38C of the transceiver logic 38 and the RXD1, RXD2, TXD1 and TXD2 buffer registers of CAN register block 41. The interface management logic 36 also sets and resets the CAN status information and generates interrupts to the CPU.

The bit stream processor 37 includes a sequencer which controls a flow of data between the interface management logic 36 and the CAN bus (not shown). The bit stream processor 37 controls the transceiver logic 38 for receiving and transmitting messages and for bus arbitration functions. The bit stream processor also generates error frames for transmission over the CAN bus in accordance with the CAN protocol.

The transceiver logic 38 includes bit time logic 38A and a state machine which controls the output drivers, cyclic redundancy check (CRC) generator/checker logic 38B, the RX/TX shift registers 38C, clock generator circuitry 38D, and bit stuff logic 38E. The clock generator 38D generates an internal clock by dividing the incoming clock CKI by a programmable value. The bit time logic 38A uses this internal clock to generate a receive and a transmit clock signal. The receive clock signal is synchronized to the CAN bus. The operation of the transceiver control state machine, the CRC generator/checker 38B and the RX/TX shift registers 38C are controlled by the bit stream processor 37. The cyclic redundancy check (CRC) generator/checker 38B consists of a 15-bit shift register and the logic required to generate a CRC checksum of the destuffed bitstream. It informs the error management logic 39 about the result of a received checksum. The checksum is generated by the polynomial: $x^{15}+x^{14}+x^{10}+x^8+x^7+x^4+x^3+1$. The RX/TX registers 38C are two 8-bit shift registers which perform parallel-to-serial conversion of information to be transmitted and serial-to-parallel conversion of information to be received. The TX shift register is loaded byte by byte first from TXD1 and then from TXD2 by the interface management logic 36. Received data bytes are similarly read one at a time from the RX shift register and placed into the receive data registers RXD1 and RXD2 in alternating fashion.

The error management unit 39 is responsible for fault confinement of the CAN protocol. The error management unit 39 receives errors announced by the bit stream processor 37 and informs bit stream processor 37, the transceiver logic 38 and the interface management logic 36 about the error state.

There are three states in which a CAN device can be operating with respect to error handling: error active, error passive and bus off. In the error active state, the CAN device participates in bus communication and transmits an active 'dominant' error flag. In the error passive state, the CAN interface participates in bus communication but transmits a passive 'recessive' error flag upon detection of an error. A device is error passive when a transmit error counter (TEC) located in error management logic block 39 reaches an error count of greater than 127 and less than 225 or when a receive error counter (REC) located in error management logic block 39 reaches an error count of greater than 127. When a device first enters the error passive state, it transmits an active error flag. An error passive device becomes error active again when both the transit and receive error counters have counts of less than 127. In the bus off state, the output drivers driving pins TX0 and TX1 are disabled and the device does not participate in any bus activity. A device is bus off when the transmit error counter is greater than 255. A bus off device will become error active again in one of two ways depending on which mode is selected through a fault confinement mode select bit (FMOD) located in a CAN bus control register (CBUS) of CAN registers 41. The transmit error counter switches the CAN interface to the bus off state when its count exceeds 255.

Figure 5A:
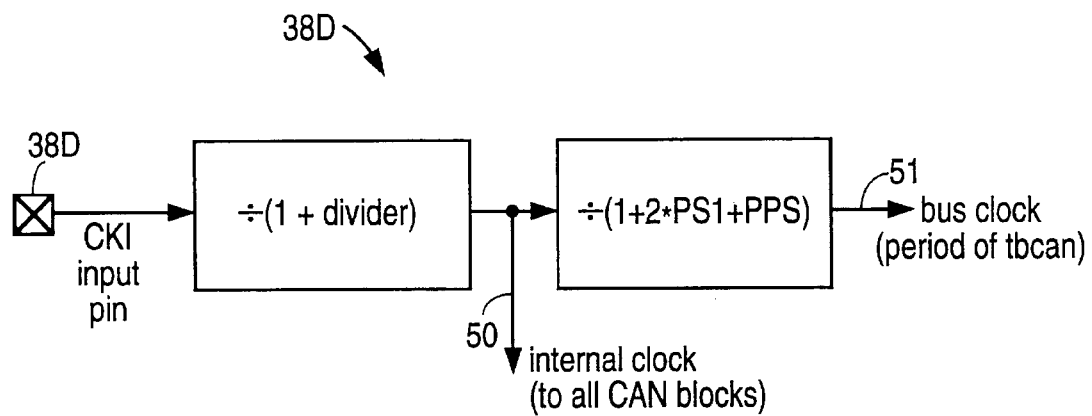
FIG. 5A is a block diagram illustrating the operation of a clock generator circuit in accordance with the present invention.

FIG. 5A is a diagram illustrating clock generator circuit 38D located within the transceiver logic block 38. The clock generator circuit divides the clock signal received on the CKI input pin 38D using the value defined in a prescaler register (CSCAL) register to generate an internal clock 50 for use by other CAN interface blocks and to generate a bus clock 51 having a bit period of tbcan in accordance with the following formula:

$$tbcan = \frac{CKI}{(1 + \text{divider}) \times (1 + 2 \times PS1 + PPS)}$$

divider is the value of the prescaler register (CSCAL) located at address 00B8. PS1 is the programmable value of phase segment 1 and 2 (1 . . . 8) at address 00B9. PPS the programmed value of the propagation segment (1 . . . 8) at address 00B9.

The bit time logic 38A of the transceiver logic block 38 synchronizes the internal clock 50 and the bus clock 51. There are two types of synchronization performed: hard synchronization and soft synchronization. Hard synchronization is done with the falling edge on the bus while the bus is idle. This condition on the bus is interpreted as the start of frame bit (SOF) which restarts the internal logic of CAN interface. Every receiving CAN interface starts with a hard synchronization on the falling edge of the SOF bit.

Figure 5B:
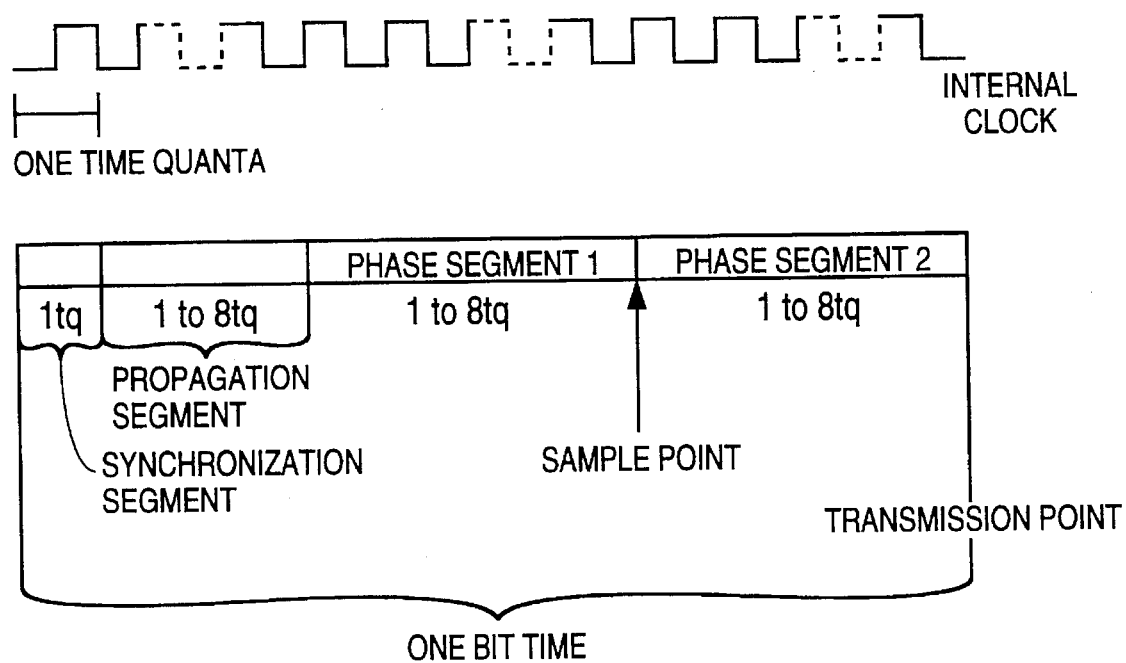
FIG. 5B is a timing diagram illustrating CAN bit timing performed in accordance with the present invention.
Figure 5C:
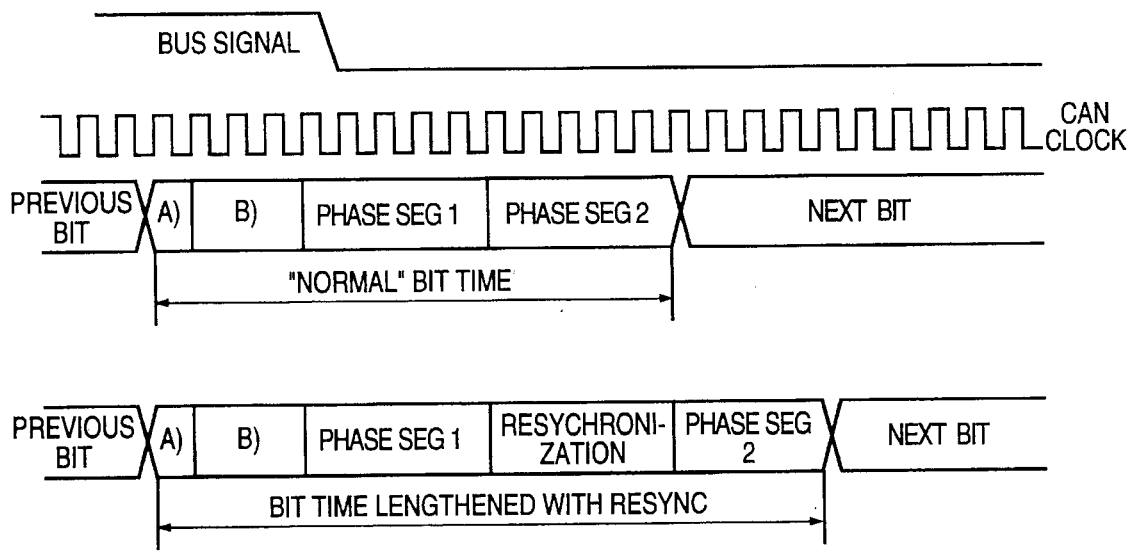
FIG. 5C and 5D are timing diagrams illustrating two synchronization sequences in accordance with the present invention.
Figure 5D:
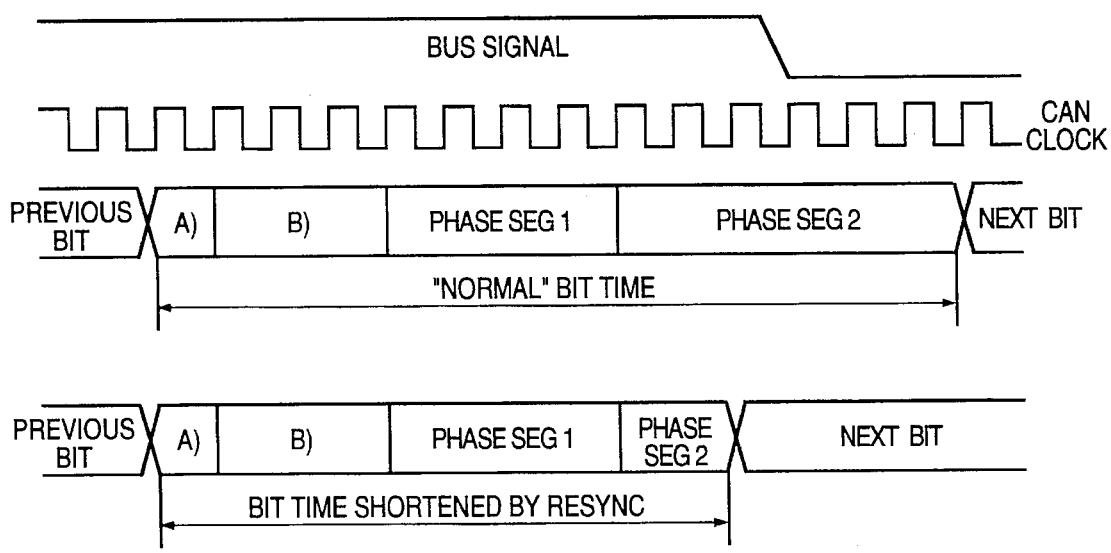

As illustrated in FIG. 5B, one bit time consists of four bit segments: synchronization segment, propagation segment, phase segment 1 and phase segment 2. Soft synchronization is used to lengthen or shorten the bit time while a data or remote frame is being received. A falling edge of a bit should occur in the synchronization segment. This segment has the fixed length of one time quanta. To compensate the various delays within a network, the propagation segment has a programmable length from 1 to 8 time quanta. Phase segments 1 and 2 are used to resynchronize during an active frame. The length of these segments is from 1 to 8 time quanta long. Whenever a falling edge of a bit is detected in the propagation segment or in phase segment 1, the segment is lengthened by a specific value called the resynchronization jump width (RJW) (see FIG. 5C). If, on the other hand, a falling edge of a bit lies in phase segment 2 (as shown in FIG. 5D), then phase segment 2 is shortened by the resynchronization jump width. Only one resynchronization is allowed during one bit time. The sample point, which is the point where the received data bits are sampled, lies between the two phase segments. The transmission point lies at the end of phase segment 2 to start a new bit time with the synchronization segment.

The output drivers/input comparators block 40 is the physical interface of the integrated circuit 19 to the CAN bus. Control signals TXEN0 and TXEN1, the logic levels of which are determined by the contents of a CAN bus control register (CBUS) at location 00BA, may tristate the output drivers to disconnect the CAN interface from the CAN bus during a 'bus off' state. Bus level definitions are set forth in the table below:

TABLE 1

| Bus Level | Pin TX0 | Pin TX1 |
|---|---|---|
| 'dominant' | drive low (GND) | drive high (Vcc) |
| 'recessive' | tristate | tristate |

Figure 1A:
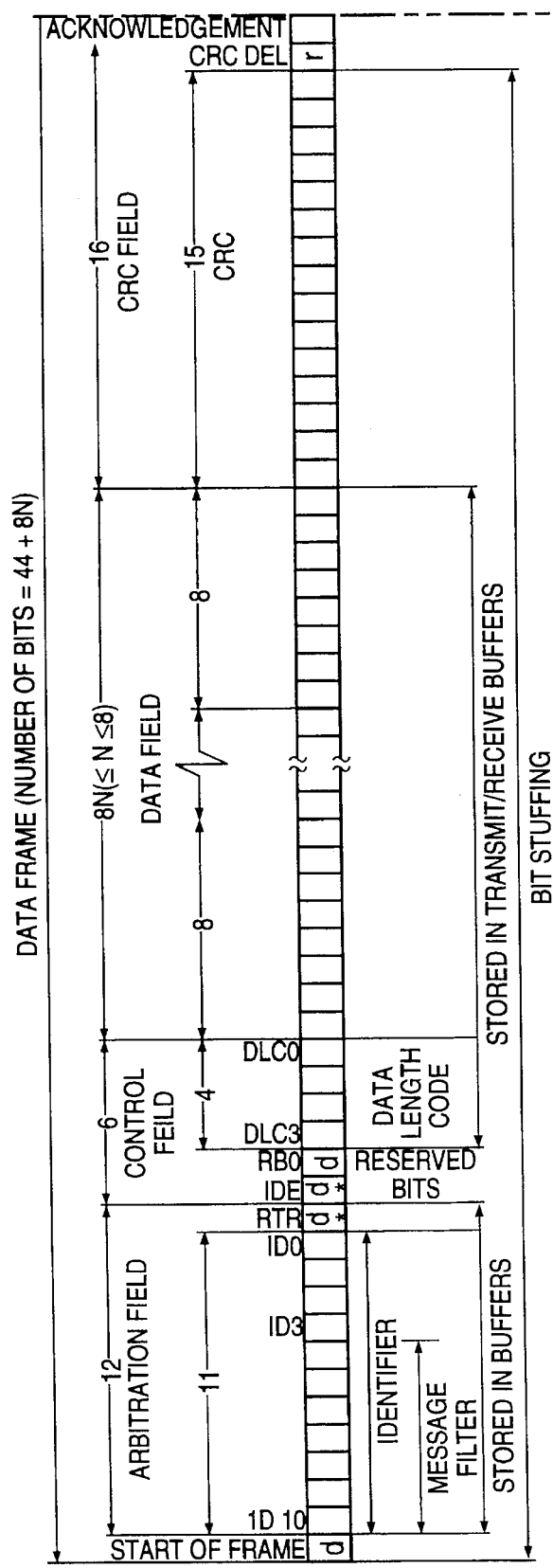
Figure 1A:
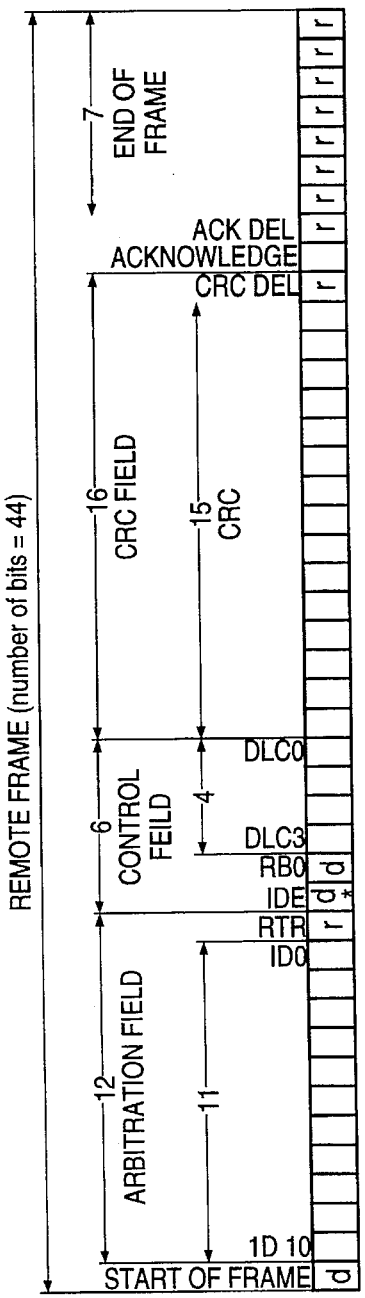
Figure 1C:
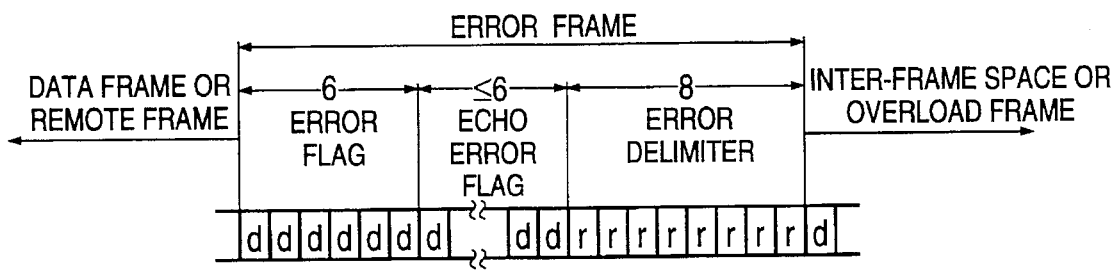
Figure 1D:
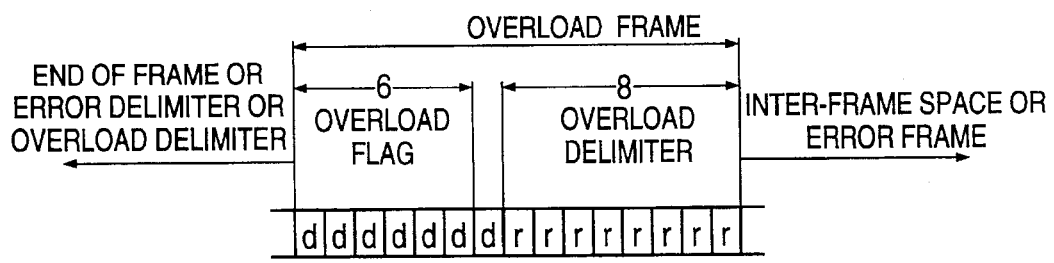
Figure 2:
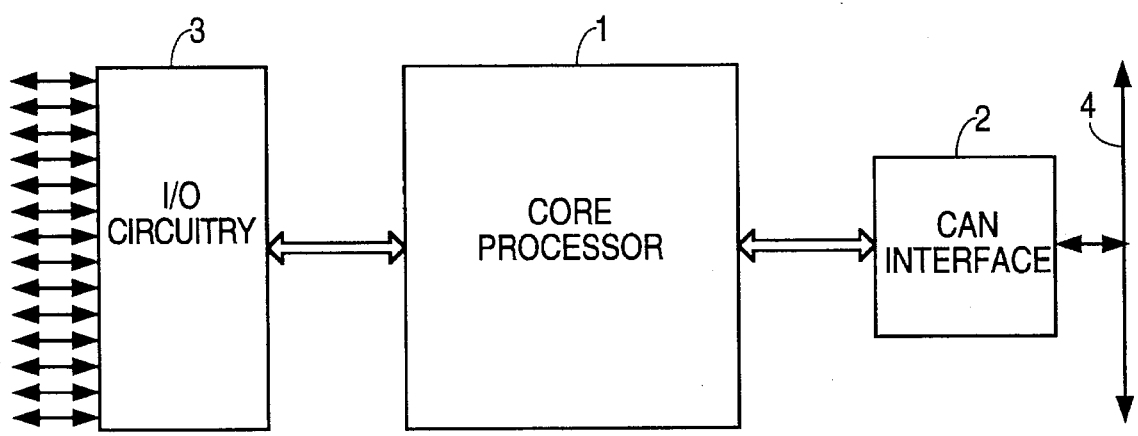
FIG. 2 (Prior Art) is a block diagram of a typical conventional electronic device coupled to a CAN bus in an automobile.

The CAN register block 41 includes fifteen 8-bit registers. The contents of the receiver related registers RXD1, RXD2, RDLC, RIDH and RTSTAT are only changed if a received frame passes through an acceptance filter located in the RIDH register or if a receive identifier acceptance filter bit (RIAF) of the CAN bus control register (CBUS) is set to disable the acceptance filter so that all messages will be accepted. Although extended CAN frames having 29 identifier bits cannot be received or transmitted by the CAN interface 21, extended CAN frames are checked and a corresponding acknowledge is generated. A transmitting node transmits the acknowledgement bit (see FIG. 1A) at the "recessive" voltage level. All receiving nodes on the bus respond to the transmission from the transmitting node by outputting "dominant" bits at the point in time when the "recessive" acknowledgement bit is sent by the transmitting node. The transmitting node can therefore determine that the transmitted frame was acknowledged by at least one receiver node.

The transmit data register 1 (TXD1) has an address of OOB0 on the internal bus 25. Register TXD1 first contains the first data byte to be transmitted within a frame. If more than two data bytes are to be transmitted, then the TXD1 register is loaded with the successive odd numbered bytes of the frame (i.e., byte number 3, then byte number 5 if there is one, then byte number 7 if there is one).

Transmit data register 2 (TXD2) has an address of OOB1 on the internal bus 25. Register TXD2 first contains the second data byte to be transmitted within a frame. If more than two data bytes are to be transmitted, then the TXD2 register is loaded with the successive even numbered bytes of the frame (i.e., byte number 2, then byte number 4 if there is one, then byte number 8 if there is one).

Transmit data length code and identifier low register (TDLC) of register block 41 has an address of 00B2 on the internal bus 25. The bits of this register are as set forth in the below table.

TABLE 2

| Bit 7 | Bit 6 | Bit 5 | Bit 4 | Bit 3 | Bit 2 | Bit 1 | Bit 0 |
|---|---|---|---|---|---|---|---|
| TID3 X | TID2 X | TID1 X | TID0 X | TDLC3 X | TDLC2 X | TDLC1 X | TDLC0 X | x denotes that the bit has a random value after reset. Register TDLC can be read and written by the core processor. Bits TID3 . . . TID0 are the four lower bits of the transmit identifier. The transmit identifier includes eleven bits in total, bits 3 to 0 of which are stored in bits 7 to 4 of the TDLC register. Bits TDLC3 . . . TDLC0 are the transmit data length code. These bits determine the number of data bytes to be transmitted within a frame. The following table shows the valid bit combinations for TDLC3 . . . TDLC0.

TABLE 3

| Number of data bytes | TDLC3 | TDLC2 | TDLC1 | TDLC0 |
| --- | --- | --- | --- | --- |
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |

A transmit identifier high register (TID) of register block 41 has an address of 00B3. The bits in this register are set forth in the table below.

TABLE 4

| Bit 7 | Bit 6 | Bit 5 | Bit 4 | Bit 3 | Bit 2 | Bit 1 | Bit 0 |
| --- | --- | --- | --- | --- | --- | --- | --- |
| TRTR | TID10 | TID9 | TID8 | TID7 | TID6 | TID5 | TID4 |
| X | X | X | X | X | X | X | X |

This register can be either read or written by the core processor. The bit denoted TRTR is a bit which is set if the frame to be transmitted is a remote frame. The bits TID10 . . . TID4 are the seven higher order bits of the 11-bit transmit identifier.

The receive data register 1 (RXD1) has an address of 00B4. Register RXD1 first contains the first data byte received in a frame and then contains successive odd numbered bytes of the frame (i.e., byte number 3 if there is one, then byte number 5 if there is one, then byte number 7 if there is one). This register is a read-only register.

The receive data register 2 (RXD2) has an address of 00B5. Register RXD2 first contains the second data byte received in a frame and then contains successive even numbered bytes of the frame (i.e., byte number 4 if there is one, then byte number 6 if there is one, then byte number 8 if there is one). This register is a read-only register.

The receive data length code and identifier low register (RIDL) has an address of 00B6. The bits of this register are as set forth in the table below.

TABLE 5

| Bit 7 | Bit 6 | Bit 5 | Bit 4 | Bit 3 | Bit 2 | Bit 1 | Bit 0 |
| --- | --- | --- | --- | --- | --- | --- | --- |
| RID3 | RID2 | RID1 | RID0 | RDLC3 | RDLC2 | RDLC1 | RDLC0 |
| X | X | X | X | X | X | X | X | x denotes that the bit has a random value after reset. Register RIDL is a read-only register. Bits RID3 . . . RID0 are the four lower bits of the 11-bit receive identifier. Any received frame, the identifier bits of which match the upper seven bits of the receive identifier (RID10 . . . RID4), is accepted if the receive identifier acceptable filter (RIAF) bit is set to zero. Software executing in the core processor can read the RID3 . . . RID0 bits to select between different functions implemented in one node's software (e.g., both speedometer display and clock oil pressure display may be implemented by the same CAN device located in the dashboard).

The bits RDLC3 . . . RDLC0 determine the number of data bytes within a received frame. The following table shows the valid bit combinations for RDLC3 . . . RDLC.

TABLE 6

| Number of data bytes | RDLC3 | RDLC2 | RDLC1 | RDLC0 |
| --- | --- | --- | --- | --- |
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |

The receive identifier high register (RIDH) has an address of 00B7. The bits of this register are set forth in the table below.

TABLE 7

| Bit 7 | Bit 6 | Bit 5 | Bit 4 | Bit 3 | Bit 2 | Bit 1 | Bit 0 |
| --- | --- | --- | --- | --- | --- | --- | --- |
| un-used | RID10 | RID9 | RID8 | RID7 | RID6 | RID5 | RID4 |
| X | X | X | X | X | X | X | X |

This register can be read and written by the core processor. The RID10 . . . RID4 bits represent the upper seven bits of the 11-bit receive identifier.

Figure 6:
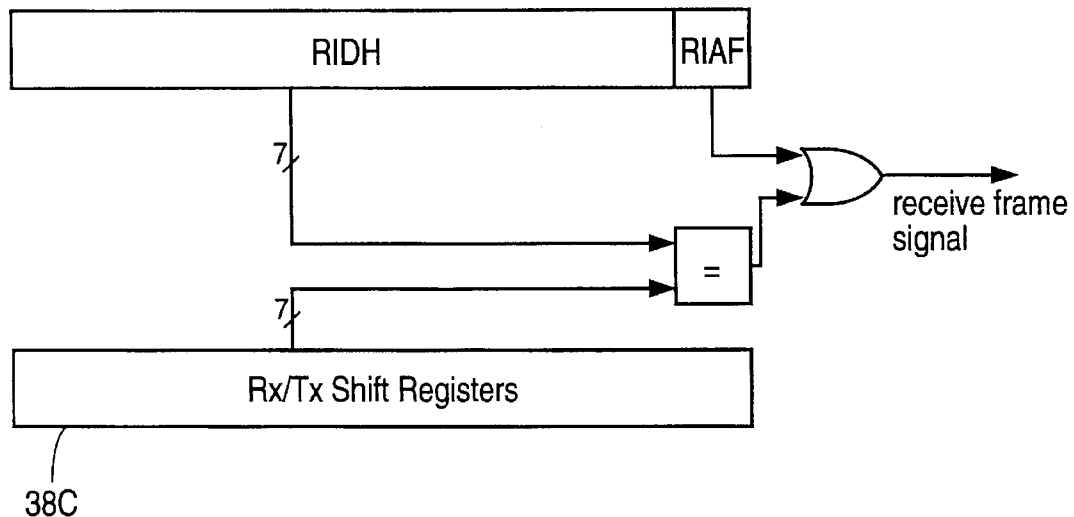
FIG. 6 is a block diagram of an acceptance filter of a CAN interface in accordance with the present invention.

FIG. 6 is a block diagram of an acceptance filter of the CAN interface 21. If the receive identifier acceptance filter (RIAF) bit of the CAN bus control register (CBUS) is set to zero, then bits 4 to 10 of the received identifier are compared with the mask bits of RID4 . . . RID10. If the corresponding bits match as determined by the acceptance filter, the incoming frame is accepted.

If the FMOD bit of the CAN bus control register (CBUS) is set to a zero, then a standard fault confinement mode is selected. In this mode, the CAN device goes from "bus off" to "error active" after monitoring 128*11 recessive bits including bus idle on the bus. This mode provides compatibility with existing CAN interfaces. Setting the FMOD bit to a one selects the enhanced fault confinement mode. In this mode, the device goes from "bus off" to "error active" after monitoring 128 "good" frames, as indicated by the reception of eleven consecutive "recessive" bits including the end of each good frame. The enhanced mode offers the advantage that a "bus off" device (i.e., a device with a serious fault) is not allowed to destroy any messages on the bus until other devices could at least transmit 128 messages. This is not guaranteed in the standard mode where a defective device may seriously impact bus communication. If, on the other hand, the receive identifier acceptance filter (RIAF) of the CAN bus control register (CBUS) bit is set to a one, then the acceptance filter (see FIG. 6) is disabled and all frames independent of the identifier bits are accepted.

The CAN prescaler register (CSCAL) has an address of 00B8 on the internal bus 25. The bits of the CSCAL register are set forth in the table below.

TABLE 8

| Bit 7 | Bit 6 | Bit 5 | Bit 4 | Bit 3 | Bit 2 | Bit 1 | Bit 0 |
|---|---|---|---|---|---|---|---|
| CKS7 | CKS6 | CKS5 | CKS4 | CKS3 | CKS2 | CKS1 | CKS0 |
| 0 | 0 | 0 | 0 | 0 | 0 | 0 | 0 |

The CAN prescaler register CSCAL register can be read and written by the core processor. The CSCAL register is used to select the internal CAN clock by dividing incoming clock signal CKI by the value of CKS+1 (The value of CKS is denoted divider in FIG. 5). The period of the resulting clock is tcan.

The CAN bus timing register (CTIM) has an address of 00B9. The bits of this register are illustrated in the table below.

TABLE 9

| Bit 7 | Bit 6 | Bit 5 | Bit 4 | Bit 3 | Bit 2 | Bit 1 | Bit 0 |
|---|---|---|---|---|---|---|---|
| PPS2 | PPS1 | PPS0 | PS2 | PS1 | PS0 | SJ1 | SJ0 |
| 0 | 0 | 0 | 0 | 0 | 0 | 0 | 0 |

The CTIM register can be read and written by the core processor. As illustrated in FIG. 5A, the PPS2 ... PPS0 bits determine the length of the propagation segment in CAN block cycles (tcan) per bit time.

TABLE 10

| PPS2 | PPS1 | PPS0 | Length of Propagation Segment |
|---|---|---|---|
| 0 | 0 | 0 | 1 tcan |
| 0 | 0 | 1 | 2 tcan |
| 0 | 1 | 0 | 3 tcan |
| 0 | 1 | 1 | 4 tcan |
| 1 | 0 | 0 | 5 tcan |
| 1 | 0 | 1 | 6 tcan |
| 1 | 1 | 0 | 7 tcan |
| 1 | 1 | 1 | 8 tcan |

The PS2 ... PS0 bits fix the number of CAN clock cycles (tcan) per bit time for phase segment 2.

TABLE 11

| PS2 | PS1 | PS0 | Length of Phase Segment 2 |
|---|---|---|---|
| 0 | 0 | 0 | 1 tcan |
| 0 | 0 | 1 | 2 tcan |
| 0 | 1 | 0 | 3 tcan |
| 0 | 1 | 1 | 4 tcan |

TABLE 11-continued

| PS2 | PS1 | PS0 | Length of Phase Segment 2 |
|---|---|---|---|
| 1 | 0 | 0 | 5 tcan |
| 1 | 0 | 1 | 6 tcan |
| 1 | 1 | 0 | 7 tcan |
| 1 | 1 | 1 | 8 tcan |

The synchronization jump width defines the maximum number of CAN cycle periods (tcan) by which a bit may be shortened or lengthened to achieve re-synchronization on "recessive" to "dominant" data transitions on the bus. The table below sets forth the synchronization jump width.

TABLE 12

| SJ1 | SJ0 | Synchronization Jump Width |
|---|---|---|
| 0 | 0 | 1 tcan |
| 0 | 1 | 2 tcan |
| 1 | 0 | 3 tcan |
| 1 | 1 | 4 tcan |

The synchronization segment is one tcan. The information processing time is one tcan.

The CAN bus control register (CBUS) has an address of 00BA on internal bus 25. The bits of the CBUS register are set forth in the below table.

TABLE 13

| Bit 7 | Bit 6 | Bit 5 | Bit 4 | Bit 3 | Bit 2 | Bit 1 | Bit 0 |
|---|---|---|---|---|---|---|---|
| CMPTST | RIAF | TXEN1 | TXEN0 | RXREF1 | RXREF0 | TSTPLA | FMOD |
| 1 | 0 | 0 | 0 | 0 | 0 | 0 | 0 |
| R/W | R/W | R/W | R/W | R/W | R/W | R/W | R/W |

If the CAN bus control register CMPTST bit is set, then the receiver comparator 42 is internally connected to the TX0 pin 30 for test purposes. The CMPTST bit only has an effect during the test mode. During normal operation, the CMPTST bit can be used as a general purpose flag bit. The meaning of the TXEN0 and TXEN1 output driver enable bits are set forth in the table below.

TABLE 14

| TXEN1 | TXEN0 | Output |
|---|---|---|
| 0 | 0 | TX0, TX1 tri-stated, CAN input comparator disabled |
| 0 | 1 | TX0 enabled |
| 1 | 0 | TX1 enabled |
| 1 | 1 | TX0 and TX1 enabled |

Resetting the TXEN1 and TXEN0 bits in bus control register (CBUS) will disable the output drivers and will initiate resynchronization to the CAN bus. During such a resynchronization, all other CAN related registers and flags are unaffected. Bus resynchronization is performed using the TXEN1 and TXEN0 bits. If the transmit output was disabled (TXEN1,TXEN0='0') and either TXEN1 or TXEN0, or both are set to 1, then the CAN interface will not start transmission or reception of a frame until eleven consecutive 'recessive' bits have been received. Resetting the TXEN1 and TXEN0 bits disables both the output drivers and the CAN input comparator 41. Preferably the core processor software resets the TXEN1 and TXEN0 bits to switch the CAN interface into the HALT mode in order to reduce current consumption and to assure proper resynchronization to the bus after exiting the HALT mode. A 'bus off' state causes output pins TX0 and TX1 to be tristated independent of the values of the TXEN1 and TXEN0 bits. The control signals TXEN0 and TXEN1 are illustrated in FIG. 4 controlling output line drivers which drive TX0 and TX1 pins 30 and 31 for ease of explanation and clarity of illustration. The CAN interface switches from 'bus off' state to 'error active' state to ensure that the device is synchronized to the bus before starting to transmit or receive.

The RXREF1 bit controls whether or not the reference voltage is applied by voltage reference 35 and multiplexer 35A to one input of comparator 42 so that the other input will be coupled to pin RX1 33. If the RXREF1 bit is set to one, then the voltage reference is supplied to the comparator 42. The RXREF0 bit controls whether or not the reference voltage is applied to the comparator 42 via multiplexer 35B such that RX0 pin is coupled to the other input of comparator 42. If the RXREF0 bit is set to one, then the voltage reference is supplied to comparator 42.

The FMOD bit is used to select the fault confinement mode used as described above. The FMOD bit is set to '0' after a power on reset.

The transmit control/status register (TCNTL) has an address of 00BB. The bits of this register are set forth in the below table.

TABLE 15

| Bit 7 | Bit 6 | Bit 5 | Bit 4 | Bit 3 | Bit 2 | Bit 1 | Bit 0 |
|---|---|---|---|---|---|---|---|
| NS1 | NS0 | TERR | RERR | CEIE | TIE | RIE | TXSS |
| 0 | 0 | 0 | 0 | 0 | 0 | 0 | 0 |
| R | R | R/W | R/W | R/W | R/W | R/W | R/W |

The meaning of the node status bits NS1 . . . NS0 is set forth in the table below. The node status bits can be read but cannot be written by the core processor.

TABLE 16

| NS1 | NS0 | Output |
|---|---|---|
| 0 | 0 | Error active |
| 0 | 1 | Error passive |
| 1 | 0 | Bus off |
| 1 | 1 | Bus off |

The CAN error interrupt enable bit (CEIE) is a bit set by software executing in the core processor in order to enable transmit error and receive error interrupts. The error interrupt pending flag bits are the TERR and RERR bits.

The transmit error bit TERR is automatically set when an error occurs during transmission of a frame. The TERR bit can be programmed to generate an interrupt to the core processor by setting the CAN error interrupt enable bit (CEIE).

The TERR interrupt is used for frames having data fields of more than two bytes. If an error occurs during the transmission of a frame having more than two data bytes, software executing in the core processor must handle the correct reloading of the data bytes into the TXD1 and TXD2 registers for re-transmission of the frame. For frames with two or fewer data bytes, the interface management logic block 36 performs an automatic retransmission. Regardless of the number of data bytes in the frame, the software executing in the core processor must reset the TERR bit if the CEIE bit is enabled in order to prevent a false interrupt from being generated immediately upon the core processor software's return from the error interrupt service routine.

The receive error bit (RERR) is automatically set when an error occurred during the reception of a frame. The RERR bit can be programmed to generate an interrupt by setting the CAN error interrupt enable bit (CEIE). As in the case of the TERR bit, the RERR bit must be cleared by the software executing in the core processor to prevent a false interrupt from being generated immediately upon a return from the error interrupt service routine.

The transmit interrupt enable bit (TIE) is another bit which may be set by software executing in the core processor. Setting this bit enables a transmit buffer empty TBE interrupt to the core processor. The TBE interrupt is generated after an odd data byte has been transmitted. At this time, the subsequent even data byte has been loaded into the TX shift register 38C. The contents of the two TXD1 and TXD2 registers may be changed. The TXD1 register must, however, be written when an additional byte is to be transmitted, before the subsequent even byte has been shifted out of the TX shift register 38C, and before the TX shift register 38C reads the TXD1 register for another data byte to transmit. If the TXD1 register is not written in time, the TX shift register will be loaded with the previous data byte already transmitted rather than the next data byte in the frame. When two additional data bytes are to be transmitted, new bytes may be written into TXD1 and TXD2 at approximately the same time to prevent the TX shift register from being loaded with old data bytes.

The receive interrupt enable bit (RIE) is another bit which may be set by software executing in the core processor. Setting this bit enables a receive buffer full RBF interrupt. In similar fashion to the TXD1 and TXD2 registers, the RXD1 and RXD2 registers must be read after a RIE interrupt is generated and before the RX shift register 38C overwrites the RXD1 and RXD2 registers with the subsequent data bytes of the frame.

The transmission start/stop (TXSS) bit is a bit which may be set by software executing in the core processor to initiate transmission of a frame. Once this bit is set, a transmission is pending as indicated by the TXPND flag being set in the receive/transmit status (RTSTAT) register. The TXSS bit can be reset by software in order to cancel a transmission of a frame when the transmission has not yet started (bus idle) or when arbitration has been lost during receiving a frame. If a transmission of a frame has already been started (won arbitration), then the TXPND flag will stay set until the transmission is completed even if the core processor software clears the TXSS bit. If one or more data bytes are to be transmitted, the core processor software must load the transmit data register(s) before the TXSS bit is set. The TXSS bit need not be reset by writing a zero to the TXSS bit prior to initiating a new transmission. A new write of a one to the TXSS bit will initiate a new transmission, regardless of the prior state of the TXSS bit.

The receive/transmit status register (RTSTAT) has an address of 00BC on the internal bus 25. This register is a read only register. The table below illustrates the bits in this register.

TABLE 17

| Bit 7 | Bit 6 | Bit 5 | Bit 4 | Bit 3 | Bit 2 | Bit 1 | Bit 0 |
|---|---|---|---|---|---|---|---|
| TBE | TXPND | RRTR | ROLD | RORN | RFV | RCV | RBF |
| 1 | 0 | 0 | 0 | 0 | 0 | 0 | 0 |

The transmit buffer empty (TBE) bit of the RTSTAT register is set as soon as the TXD2 register is copied into the TX shift register 38C, i.e. upon completion of the transmission of the data byte which was in TXD1. In the case of a odd number of data bytes in the frame, it is also set when the CRC following the data is being transmitted. This setting of the TBE bit indicates that the last data byte has been transferred from the TXD1 register to the TX shift register. The TBE bit is automatically reset when the TXD2 register is written. Accordingly, when an odd number of data bytes are to be transmitted, the software executing in the core processor should write a dummy byte to the TXD2 register to clear the TBE bit.

By setting the transmit interrupt enable bit (TIE) of the TCNTL register, the CAN interface can be programmed to generate an interrupt to the core processor upon a transmit buffer empty condition. When servicing the transmit buffer empty interrupt, the core processor software must clear the TBE bit by executing a write instruction to the TXD2 register in order to prevent a false interrupt from being generated immediately upon returning from the interrupt service routine. The TBE bit is set to one upon reset.

The transmission pending bit (TXPND) is set as soon as the transmit start/stop bit (TXSS) is set by core processor software. The TXPND bit remains set until the frame is successfully transmitted or until the transmission is successfully canceled by resetting the transmission start/stop bit (TXSS). Resetting the TXSS bit will only cancel a transmission of a frame if the transmission of the frame has not yet started (bus idle) or if arbitration has been lost during receiving a message. If a transmission has already been started (won arbitration), then the TXPND flag will remain set until the transmission is completed even if the TXSS bit is cleared by the core processor software.

The receive mode bit (RCV) is set after the data length code of a frame that passes the acceptance filter (see FIG. 6) has been received. The RCV bit is automatically reset after the CRC-delimiter of the same frame has been received.

The receiver overrun bit (RORN) is automatically set upon an overrun of the receive data register, i.e., if the core processor did not properly service the RXD1 and RXD2 registers when receiving a frame. The RORN bit is automatically reset through a read of the receive/transmit status register (RTSTAT). The core processor software clears this bit by reading the receive/transmit register before the next frame is received.

The received overload frame bit (ROLD) is automatically set when an overload frame was received on the bus. The ROLD is automatically reset through a read of the receive/ transmit status register (RTSTAT). The core processor software clears this bit by reading the receive/transmit register before the next frame is received.

The received remote transmission request bit (RRTR) is set when the remote transmission request (RTR) bit in a received frame is set. The RRTR bit is automatically reset through a read of the receive/transmit status register. To detect a received transmission request, the core processor can either poll the RRTR flag or the core processor can enable a receive buffer full (RBF) interrupt. A reception of a remote transmission request will also cause an interrupt if the RBF interrupt is enabled. If the RBF interrupt is enabled, the RBF interrupt service routine executing in the core processor should check the RRTR flag in order to distinguish between a RRTR interrupt and a RBF interrupt. It is the responsibility of the core processor software to clear this bit by reading the receive/transmit register before the next frame is received.

The received frame valid (RFV) bit is set if the received frame is valid, i.e., after the second to the last bit of the end of frame was received. The RFV bit is reset through a read of the receive/transmit status register (RTSTAT). The core processor software clears the RFV bit by reading the receive/ transmit register before the next frame is received.

The receive buffer full bit (RBF) is set if the second data byte of each successive pair of incoming data bytes was received or if the CAN interface receives the CRC. The RBF bit is reset automatically after the RXD1 register is read by the core processor software. Setting the receive interrupt enable bit (RIE) of the TCNTL register causes the receive buffer full RBF bit to generate an interrupt to the core processor. When servicing the interrupt, the core processor software clears the RBF bit by executing a load instruction to read the RXD1 register so that a false interrupt will not be generated immediately upon return from the interrupt service routine. The RBF bit is read-only.

An 8-bit transmit error counter (TEC) may be read or loaded at address 00BD on the internal bus 25. The bits of the TEC register are set forth in the table below.

TABLE 18

| Bit 7 | Bit 6 | Bit 5 | Bit 4 | Bit 3 | Bit 2 | Bit 1 | Bit 0 |
|---|---|---|---|---|---|---|---|
| TEC7 | TEC6 | TEC5 | TEC4 | TEC3 | TEC2 | TEC1 | TEC0 |
| 0 | 0 | 0 | 0 | 0 | 0 | 0 | 0 |

If the lower seven bits of the TEC counter overflow, i.e. TEC7 is set, then the CAN interface is 'error passive'. Writing the value of zero to the transmit error counter TEC register will reset the entire CAN interface. To prevent interference with CAN fault confinement, core processor software should not write to the REC/TEC registers. Both counters are automatically updated in accordance with the CAN specification.

The receiver error counter (REC) may be read or loaded at address OOBE on the internal bus 25. The bits of the REC register are set forth in the table below.

TABLE 19

| Bit 7 | Bit 6 | Bit 5 | Bit 4 | Bit 3 | Bit 2 | Bit 1 | Bit 0 |
|---|---|---|---|---|---|---|---|
| ROVL | REC6 | REC5 | REC4 | REC3 | REC2 | REC1 | REC0 |
| 0 | 0 | 0 | 0 | 0 | 0 | 0 | 0 |

A 7-bit receive error counter (REC) is mapped into the data memory of the core processor via bits REC6 . . . REC0 in order to allow the core processor to determine node status and allow testing. If the receive error counter overflows, then the ROVL bit is automatically set to indicate that the CAN interface is 'error passive' and that the CAN interface will not transmit any active error frames. When ROVL is set, the receive error counter is frozen.

An additional read/write register, the bitstream processor PLA test register (PLATST), has an address of OOBF on the internal bus 25. This register is usable to test various functions of the CAN interface block. The PLATST register is updated by CAN interface hardware with every tbcan clock cycle. The values written by the core processor software are saved in an internal latch and with the next tbcan cycle the status of various CAN block functions are written by the CAN interface hardware into the PLATST register.

The following table shows the bits of the PLATST register for writes to the PLATST register.

TABLE 20

| Bit 7 | Bit 6 | Bit 5 | Bit 4 | Bit 3 | Bit 2 | Bit 1 | Bit 0 |
|---|---|---|---|---|---|---|---|
| TSRERR | TSTDLCZ | TSTEQZ | TSTREM | TSTSTF | TSTWAIT | TSTDRV | TSTMON |

The TSTERR bit mimics having a CRC error if set to '1'. The TSTDLCZ bit mimics a data length code (DLC) of zero if set to '1'. The TSTEQZ bit causes the bit stream processor state counter to be bypassed if the TSTEQZ bit is set to '1'. The TSTREM bit causes the BSP to process a remote frame if set to '1'. The TSTSTF bit mimics a stuff condition. The TSTWAIT bit forces the bit stream processor to count groups of eleven bits if set to '1'. The TSTDRV bit simulates output data. The TSTMON bit simulates receive data.

The following table shows the bits of the PLATST register for core processor reads of the PLATST register. The following bits values are written to the PLATST register by CAN interface hardware after every tbcan cycle.

TABLE 21

| Bit 7 | Bit 6 | Bit 5 | Bit 4 | Bit 3 | Bit 2 | Bit 1 | Bit 0 |
|---|---|---|---|---|---|---|---|
| RXCK | RPT | BSP5 | BSP4 | BSP3 | BSP2 | BSP1 | BSP0 |

The RXCK bit is the output of the bit time logic block 38A. The RPT bit outputs a low going pulse generated by the bit stream processor 37. This indicates start or restart of a particular field of a frame. The BSP5 . . . BSP0 bits can be read to determine the machine code of the current state of the bit stream processor 37. BSP5 indicates whether the CAN device is in receive mode ('1') or transmit mode ('0').

Figure 7:
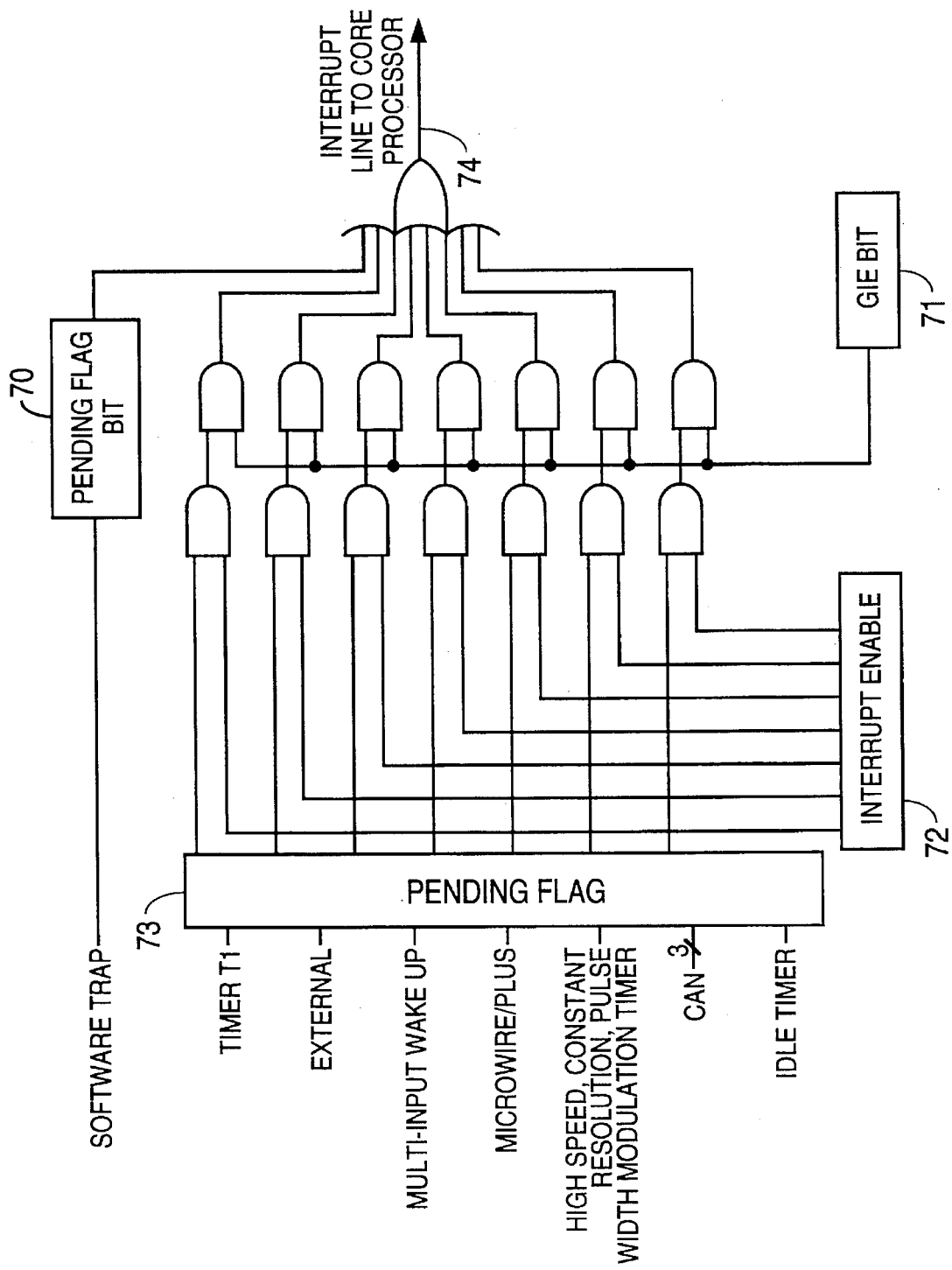
FIG. 7 is a block diagram of interrupt circuitry connecting the CAN interface and the core processor in accordance with the present invention.

FIG. 7 is a block diagram of interrupt logic located in the core processor block 20. The core processor 20 supports a vectored interrupt scheme supporting a total of twelve interrupt sources. Interrupt line 74 carries a level triggered interrupt signal. A digital level "high" on line 74 signals an interrupt in the structure of FIG. 7 although equivalent circuitry may be implemented having a digital "low" level interrupt.

Table 22 lists all the possible interrupt sources, their arbitration ranking and the memory locations reserved for the interrupt vector for each source. Two bytes of program memory space are reserved for each interrupt source. All interrupt sources except the software interrupt are maskable. Each of the maskable interrupts has an enable bit in interrupt enable block 72 and a pending bit in pending flag block 73. The individual memory units of the interrupt enable block 72 and the pending flag block 73 may reside in various of the peripheral blocks of FIG. 3. A single pending flag block 73 and a single interrupt enable block 72 are illustrated in FIG. 7 to facilitate understanding of the interrupt circuitry. In FIG. 7, a maskable interrupt is active if its associated enable and pending bits are set. If the global interrupt bit (GIE) 71 is set to one and if an interrupt is active, then interrupt line 74 will be asserted and the core processor will be interrupted as soon as it is ready to start executing an instruction unless the above conditions happen during the software trap service routine. This exception is described in the discussion of the software trap below.

The interrupt process is accomplished with the INTR instruction (opcode 00), which is written into the core processor instruction register and replaces the opcode about to be executed. The following steps are performed for every interrupt: 1) The GIE (global interrupt enable) bit 71 is reset; 2) The address of the instruction about to be executed is pushed into the stack; and 3) The PC (program counter) branches to address 00FF. This procedure takes seven cycles to execute.

At this time, other maskable interrupts are disabled because the global interrupt bit 71 is cleared to 0. The user is now free to do context switching by saving the context of the machine in the stack with PUSH instructions. The user may then program a VIS (vector interrupt select) instruction in order to branch to the interrupt service routine of the highest priority interrupt which is enabled and pending at the time of the VIS. Note that this is not necessarily the interrupt that caused the branch to address location 00FF Hex prior to the context switching.

Thus, if an interrupt with a higher rank than the one which caused the interrupt becomes active before the decision of which interrupt to service is made by the VIS, then the interrupt with the higher rank will override any lower ones and will be acknowledged. The lower priority interrupt(s) are still pending, however, and will cause another interrupt(s) immediately following the completion of the interrupt service routine associated with the higher priority interrupt just serviced. This lower priority interrupt(s) will occur immediately following the RETI (return from interrupt) instruction at the end of the interrupt service routine just completed.

Inside the interrupt service routine, the associated pending bit is cleared by software. The RETI (Return from Interrupt) instruction at the end of the interrupt service routine sets the GIE (global interrupt enable) bit, allowing the core processor to be interrupted again if another interrupt is active and pending. The VIS instruction looks at all the active interrupts at the time it is executed and causes an indirect jump to the beginning of the service routine of the highest rank to be performed. The addresses of the different interrupt service routines, called vectors, are chosen by the user and stored in ROM 23 in a table starting at O1E0 (assuming that VIS is located between O0FF and O1DF). Each vector is 15-bit wide and therefore occupies two ROM locations. VIS and the vector table is located in the same 256-byte block (Oy00 to OyFF) unless VIS is located at the last address of a block. In this case, the table is in the next block. The vector table cannot be inserted in the first 256-byte block.

The vector of the maskable interrupt with the lowest rank is located at OyE0 (Hi-Order byte) and OyE1 (Lo-Order byte). The vector of the maskable interrupt with the highest rank is located at OyFA (Hi-Order byte) and OyFB (Lo-Order byte). The software trap has the highest rank and its vector is located at OyFE and OyFF.

TABLE 22

| Arbitration Ranking | Source | Vector Address Hi-Low Byte |
|---|---|---|
| 1 | Software Trap | OyFE-OyFF |
| 2 | Reserved | OyFC-OyFD |
| 3 | CAN Receive | OyFA-OyFB |
| 4 | CAN Error (transmit/receive) | OyF8-OyF9 |
| 5 | CAN Transmit | OyF6-OyF7 |
| 6 | Pin G0 Edge | OyF4-OyF5 |
| 7 | IDLE Timer Underflow | OyF2-OyF3 |
| 8 | Timer T1A/Underflow | OyF0-OyF1 |
| 9 | Timer T1B | OyEE-OyEF |
| 10 | MICROWIRE/PLUS | OyEC-OyED |
| 11 | PWM timer | OyEA-OyEB |
| 12 | Reserved | OyE8-OyE9 |
| 13 | Reserved | OyE6-OyE7 |
| 14 | Reserved | OyE4-OyE6 |
| 15 | Port L/Wakeup | OyE2-OyE3 |
| 16 | Default VIS Interrupt | OyE0-OyE1 |

If, by accident, a VIS is executed when no interrupt is active, then the PC (program counter) will branch to a vector located by OyE0-OyE1. This vector can point to the Software Trap (ST) interrupt service routine, or to another special service routine as desired.

The software trap is a special kind of non-maskable interrupt which occurs when the INTR instruction (used to acknowledge interrupts) is fetched from ROM and placed inside the instruction register. This may happen when the PC is pointing outside the available ROM address space or when the stack is over-popped. When a software trap occurs, the user can re-initialize the stack pointer and do a recovery procedure (similar to RESET, but not necessarily containing all of the same initialization procedures) before restarting. The occurrence of a software trap is latched into the ST pending flag bit 70 (see FIG. 7). The GIE bit 71 is not affected and the ST pending flag bit (not accessible by the user) is used to inhibit other interrupts and to direct the program to the software trap service routine with the VIS instruction. The RPND instruction is used to clear the software interrupt pending flag bit. This bit is also cleared on reset. The ST has the highest rank among all interrupts. Nothing (except another ST) can interrupt an ST being serviced.

Figure 8:
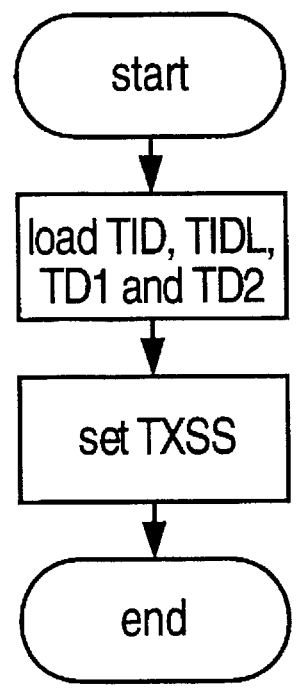
FIG. 8 is a flowchart of an example of a CAN transmit routine executing in the core processor for frames having from zero to two data bytes and for remote frames in accordance with the present invention.
Figure 9:
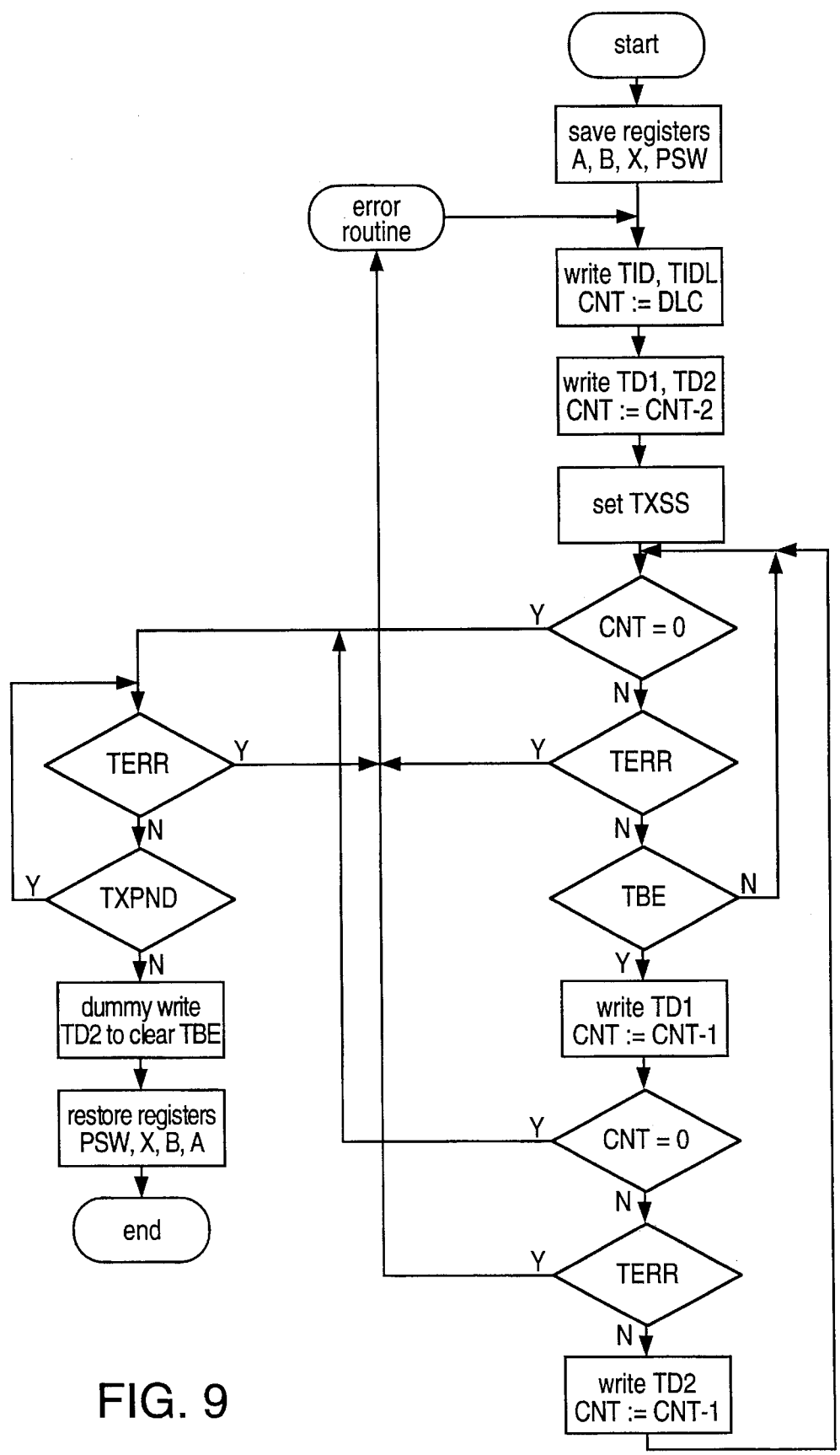
FIG. 9 is a flowchart of an example of a CAN transmit routine executing in the core processor for frames having more than two data bytes in accordance with the present invention.
Figure 10:
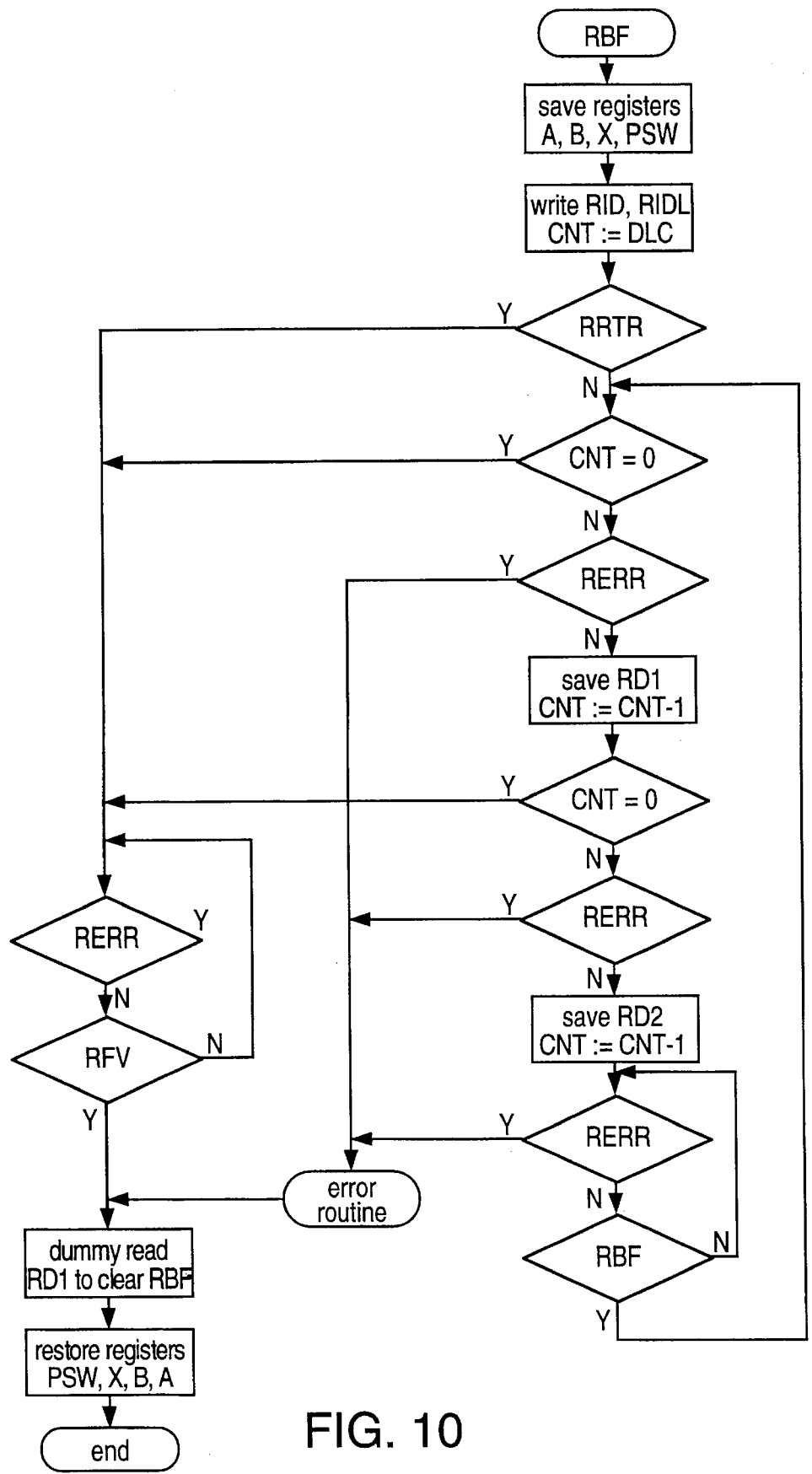
FIG. 10 is a flowchart of an example of a CAN receive routine executing in the core processor for frames having from zero to eight data bytes including RTR in accordance with the present invention.
Figure 11:
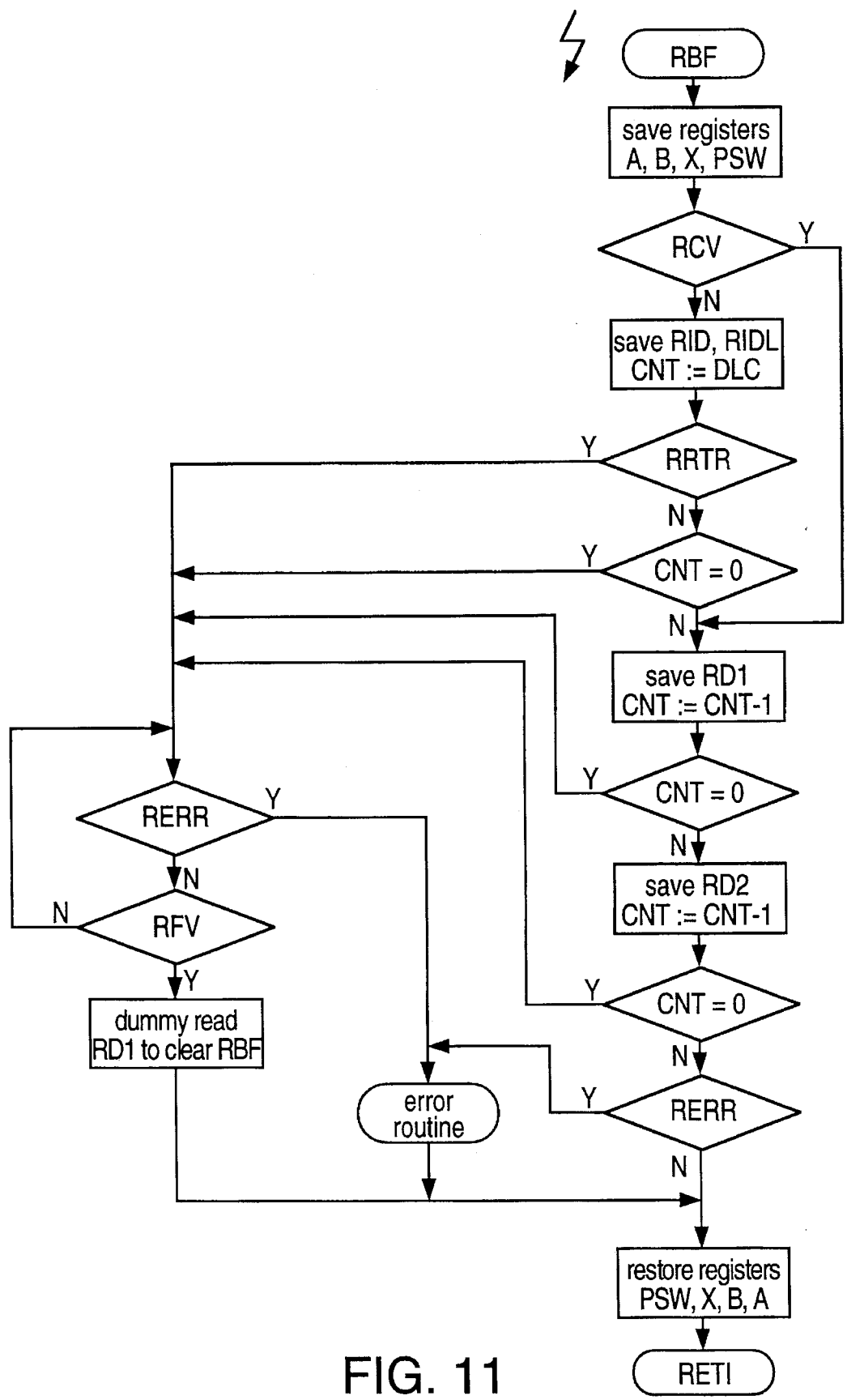
FIG. 11 is a flowchart of an example of a CAN receiver interrupt routine executing in the core processor for frames having from zero to eight data bytes including RTR in accordance with the present invention.

FIG. 8 is a flowchart of an example of a CAN transmit routine executing in the core processor for messages having from zero to two data bytes and for remote frames. FIG. 9 is a flowchart of an example of a CAN transmit routine executing in the core processor for messages having more than two data bytes. DLC is the data length code. TERR is the transmit error bit of Table 15. FIG. 10 is a flowchart of an example of a CAN receive polling routine executing in the core processor for messages having from zero to eight data bytes including RTR. RERR is the receive error bit of Table 15. FIG. 11 is a flowchart of an example of a CAN receiver interrupt routine executing in the core processor for message from zero to eight data bytes including RTR. FIG. 12 is a flowchart of an example of a CAN interrupt controlled transmit routine executing in the core processor. FIG. 13 is a flowchart of an example of a CAN transmit interrupt routine only for messages having more than two data bytes.

Although specific embodiments of the present invention have been described in order to illustrate the invention, the present invention is not limited thereto. Automotive CAN interfaces may, for example, be made having only one transmit and only one receive byte using the pipelining technique and associated indication between the core and the CAN interface logic to further reduce silicon area. A core processor having an architecture other than the architecture of the COP888BC described in connection with a specific embodiment may be used. The present invention is not limited to the CAN bus, but rather relates to other serial buses including the VAN bus. Various adaptations, modifications and substitutions of various elements and features of the specific embodiment described can be combined without departing from the scope of the invention as defined in the appended claims.

We claim:

1. A controller area network (CAN) interface unit comprising a bit stream processor, the bit stream processor announcing when errors are received from a CAN bus;

error management logic coupled to the bit stream processor, the error management logic receiving errors announced by the bit stream processor, determining in which of a plurality of error states the CAN interface is operating and informing the bit stream processor of which of a plurality of states the CAN interface is operating, the states including an error active state in which the CAN interface participates in bus communication and transmits a dominant error flag, an error passive state in which the CAN interface participates in bus communication and transmits a recessive error flag, the error active state transitioning to the error passive state when an error count is greater than or equal to a first predetermined number, and a busoff state in which the CAN interface does not participate in CAN bus activity, the error active state transferring control to the busoff state when a count is greater than or equal to a second predetermined number, the second predetermined number being greater than or equal to the first predetermined number, the busoff state transitioning to the error active state using a fault recovery method selected from between a first fault recovery method and a second fault recovery method, the first fault recovery method transitioning to the error active state after receiving a predetermined number of recessive bits by the CAN interface and the second fault recovery method transitioning to the error active state after receiving a predetermined number of good CAN frames.

2. The CAN interface of claim 1 wherein good frames are determined by detecting end of frame messages.

3. A method of providing a controller area network (CAN) node of a CAN system with an enhanced fault recovery feature comprising:

setting the CAN node to a busoff state when an error is detected by the CAN node;

determining whether to use a first or a second fault recovery method;

the first fault recovery method including
   detecting when a predetermined number of recessive bits have been received by the CAN node; and,
   setting the CAN node to an error active state when the predetermined number of recessive bits have been received by the CAN node;

the second fault recovery method including
   receiving a plurality of CAN frames;
   detecting when good CAN frames are received by the CAN node; and
   setting the CAN node to an error active state when a predetermined number of good CAN frames are detected; and performing one of the first and second fault recovery methods based upon the determining step.

4. The method of claim 3 wherein the second detecting step further comprises determining when an end of frame signal is received by the CAN node.

5. The method of claim 4 wherein the end of frame signal includes a plurality of recessive bits and, the determining step includes counting the plurality of recessive bits.

* * * * *